United States Patent
Nonaka

(10) Patent No.: US 11,865,867 B2
(45) Date of Patent: Jan. 9, 2024

(54) MOTORCYCLE TIRE

(71) Applicant: Sumitomo Rubber Industries, Ltd., Kobe (JP)

(72) Inventor: Kenji Nonaka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/691,383

(22) Filed: Mar. 10, 2022

(65) Prior Publication Data

US 2022/0324260 A1    Oct. 13, 2022

(30) Foreign Application Priority Data

Apr. 8, 2021 (JP) .................................. 2021-066059

(51) Int. Cl.
*B60C 11/00* (2006.01)
*B60C 11/03* (2006.01)

(52) U.S. Cl.
CPC ... *B60C 11/0058* (2013.01); *B60C 2011/0025* (2013.01); *B60C 2011/0033* (2013.01); *B60C 2011/0339* (2013.01)

(58) Field of Classification Search
CPC .................. B60C 11/0058; B60C 2011/0025
See application file for complete search history.

(56) References Cited

U.S. PATENT DOCUMENTS

| | | | |
|---|---|---|---|
| 9,248,702 B2 | 2/2016 | Otani et al. | |
| 2009/0020200 A1* | 1/2009 | Ogawa | B60C 11/00 156/117 |
| 2018/0126788 A1 | 5/2018 | Taniguchi | |
| 2019/0263183 A1* | 8/2019 | Kono | B60C 11/033 |

FOREIGN PATENT DOCUMENTS

| | | | |
|---|---|---|---|
| JP | 08-169208 A | * | 7/1996 |
| JP | 2006-273248 A | | 10/2006 |
| JP | 2017-081429 A | * | 5/2017 |
| JP | 2018-76002 A | | 5/2018 |
| JP | 2018-168300 A | * | 11/2018 |
| JP | 6498560 B2 | | 4/2019 |

OTHER PUBLICATIONS

Machine translation for Japan 2018-168300 (Year: 2022).*
Machine translation for Japan 2017-081429 (Year: 2022).*
Machine translation for Japan 08-169208 (Year: 2022).*
Extended European Search Report for European Application No. 22160057.0, dated Aug. 1, 2022.

* cited by examiner

*Primary Examiner* — Steven D Maki
(74) *Attorney, Agent, or Firm* — Birch, Stewart, Kolasch & Birch, LLP

(57) ABSTRACT

A motorcycle tire includes a tread rubber that includes a base rubber layer and a cap rubber layer disposed outward in the tire radial direction of the base rubber layer to form a ground contact surface. The cap rubber layer includes a crown cap portion disposed in a middle region in the tire axial direction of a tread portion and a pair of shoulder cap portions disposed in both sides in the tire axial direction of the crown cap portion. The crown cap portion has a loss tangent tan δc, the shoulder cap portions have a loss tangent tan δs, and the base rubber layer has a loss tangent tan δb, wherein the loss tangents tan δc, tan δs and tan δb satisfy the following equation (1): tan δc<tan δs≤tan δb . . . (1).

15 Claims, 2 Drawing Sheets

MOTORCYCLE TIRE

RELATED APPLICATIONS

This application claims the benefit of foreign priority to Japanese Patent Application No. JP2021-066059, filed Apr. 8, 2021, which is incorporated by reference in its entirety.

FIELD OF THE INVENTION

The present disclosure relates to a motorcycle tire.

BACKGROUND OF THE INVENTION

Conventionally, various motorcycle tires having improved tread rubber have been proposed. For example, Patent Document 1 below discloses a motorcycle tire having a tread rubber which includes a base rubber layer and a pair of shoulder rubber layers made of a rubber composition with a larger amount of oil component than that of the base rubber layer. The motorcycle tire can be expected to exhibit excellent durability and steering stability.
[Patent document]
[Patent document 1] Japanese Unexamined Patent Application Publication 2018-76002

SUMMARY OF THE INVENTION

Recent years, with the increasing performance of motorcycles, there has been a demand for motorcycle tires with excellent grip performance during turning. On the other hand, in motorcycle tires, when the grip performance is improved, the wear resistance during straight running may be impaired.

The present disclosure has been made in view of the above circumstances and has a major object to provide a motorcycle tire capable of improving grip performance during turning while maintaining wear resistance during straight running.

In one aspect of the present disclosure, a motorcycle tire includes a tread portion with a ground contact surface, the tread portion including a tread rubber including a base rubber layer and a cap rubber layer disposed outward in a tire radial direction of the base rubber layer to form the ground contact surface of the tread portion, the cap rubber layer including a crown cap portion disposed in a middle region in a tire axial direction of the tread portion and a pair of shoulder cap portions disposed in both sides in the tire axial direction of the crown cap portion, and the crown cap portion having a loss tangent tan δc at 0 degrees C., the shoulder cap portions having a loss tangent tan δs at 0 degrees C., and the base rubber layer having a loss tangent tan δb at 0 degrees C., wherein the loss tangents tan δc, tan δs and tan δb satisfy the following equation (1):

$$\tan \delta c < \tan \delta s \leq \tan \delta b \quad (1).$$

DETAILED DESCRIPTION OF THE INVENTION

Figure 1:
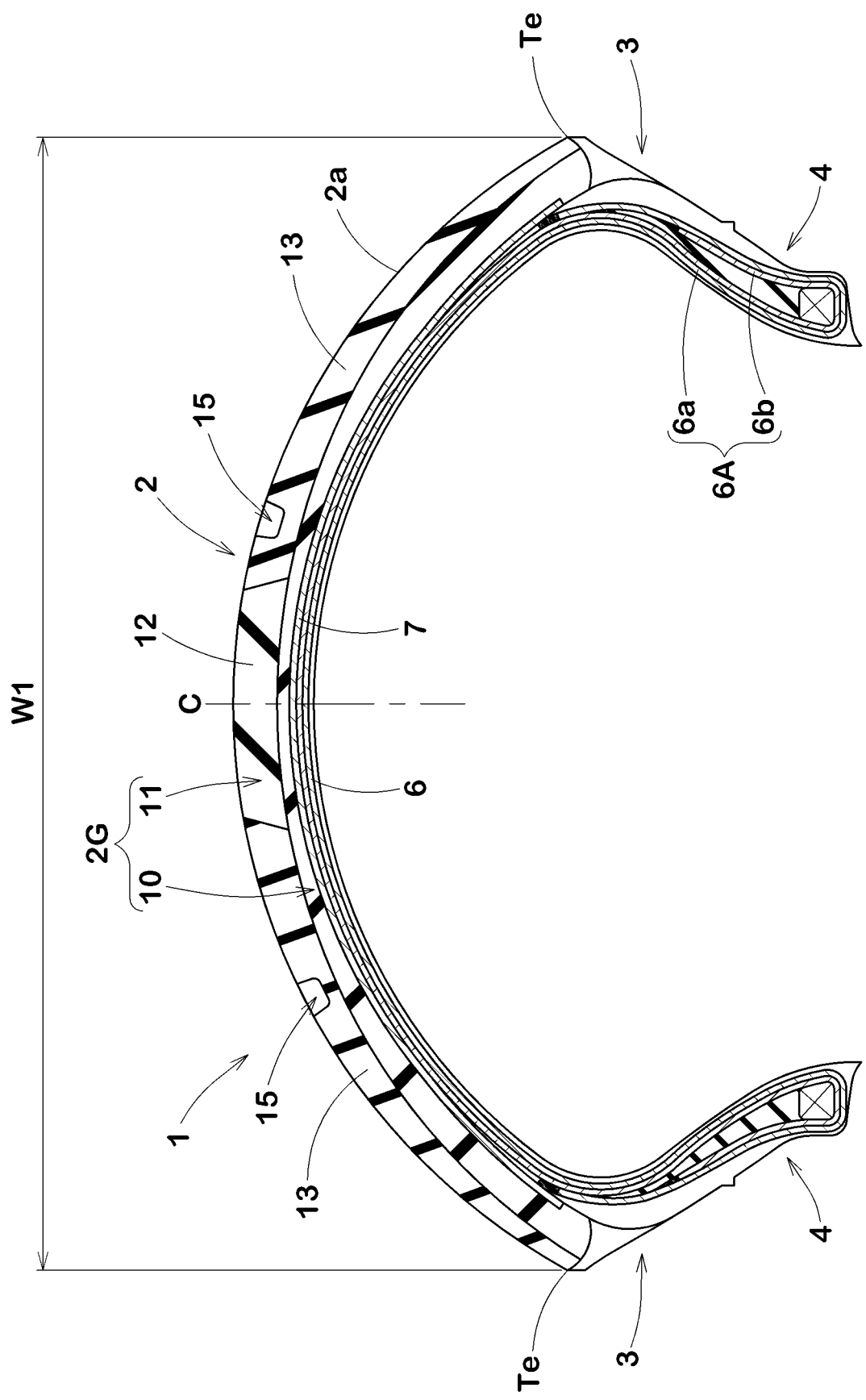
FIG. 1 is a cross-sectional view of an embodiment of a motorcycle tire in accordance with the present disclosure.

Hereinafter, one or more embodiments of the present disclosure will be described with reference to the drawings. FIG. 1 is a cross-sectional view including a tire axis of an embodiment of a motorcycle tire 1 (hereafter, simply referred to as "tire") in accordance with the present disclosure. Note that in FIG. 1 the tire 1 is under a normal state. The tire 1 according to the present embodiment is a tire for rear wheel of motorcycle suitable for sports driving on the road. However, the tire according to the present invention is not limited to such an embodiment.

As used herein, when a tire is a pneumatic tire based on a standard, the "normal state" is such that the tire 1 is mounted onto a standard wheel rim with a standard pressure but loaded with no tire load. If a tire is not based on the standards, the normal state is a standard state of use according to the purpose of use of the tire and means a state of no load. As used herein, unless otherwise noted, dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1, the tire 1 according to the present embodiment includes a tread portion 2, a pair of sidewall portions 3, and a pair of bead portions 4. The pair of sidewall portions 3 is connected to both ends in the tire axial direction of the tread portion 2. The pair of bead portions 4 is connected to inner ends of the pair of sidewall portions 3. The tread portion 2 includes a ground contact surface 2a between tread edges Te and Te. The ground contact surface 2a is curved in an arc shape manner to be convex outward in the tire radial direction to obtain a sufficient ground contact area even when turning with large camber angles. In the present embodiment, the pair of tread edges Te is located outermost in the tire axial direction.

The tire 1 according to the present embodiment includes a carcass 6 which extends between the pair of bead portions 4 through the tread portion 2 and the pair of sidewall portions 3.

The carcass 6, for example, includes at least one carcass ply 6A with a plurality of carcass cords. In the present embodiment, the carcass 6, for example, includes two carcass plies 6A. Each of the carcass plies 6A includes a main portion 6a and a pair of turn-up portions 6b. The main portion 6a extends between the pair of bead portions 4 through the tread portion 2 and the pair of sidewall portions 3. The turn-up portions 6b are turned up around respective bead cores 5 of the bead portions 4 from axially inside to outside of the tire.

A belt layer 7 is provided in the tread portion 2, for example. The belt layer 7, for example, includes at least one belt ply having a plurality of belt cords oriented at an angle of 10 to 45 degrees with respect to the tire circumferential direction. The belt layer 7 according to the present embodiment consist of a single belt ply. Alternatively, a plurality of belt plies which is superimposed may be employed. Such a belt layer 7 can enhance the tread portion 2 effectively.

Figure 2:
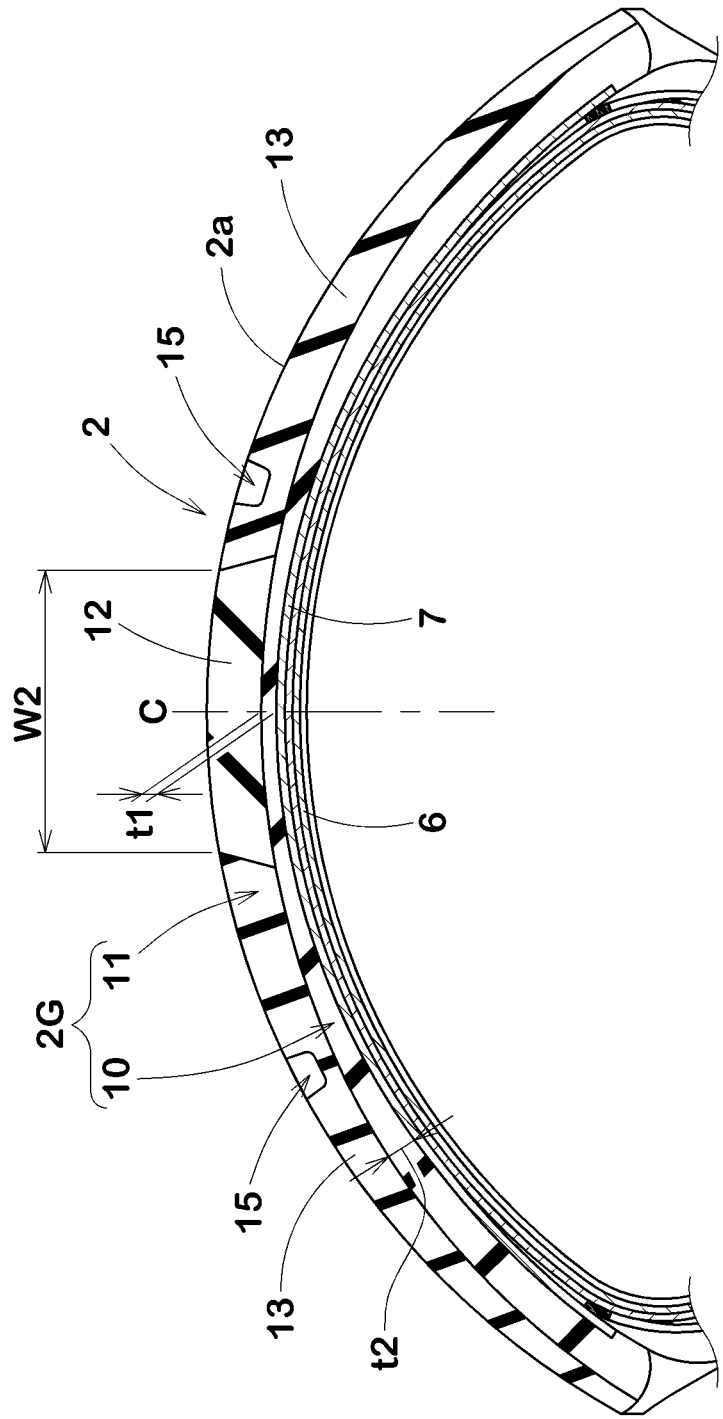
FIG. 2 is an enlarged view of a tread portion of FIG. 1.

FIG. 2 illustrates an enlarged view of the tread portion 2 of FIG. 1. As illustrated in FIG. 2, the tread portion 2 includes a tread rubber 2G disposed outward in the tire radial direction of the carcass 6 and the belt layer 7. The tread rubber 2G of the tread portion 2 includes a base rubber layer 10 and a cap rubber layer 11 disposed outward in the tire radial direction of the base rubber layer 10 to form the ground contact surface 2a of the tread portion 2.

The cap rubber layer 11 includes a crown cap portion 12 disposed in a middle region in the tire axial direction of the tread portion 2 and a pair of shoulder cap portions 13 disposed in both sides in the tire axial direction of the crown cap portion 12.

In the present disclosure, the crown cap portion 12 has a loss tangent tan δc at 0 degrees C., the shoulder cap portions 13 has a loss tangent tan δs at 0 degrees C., and the base rubber layer 10 has a loss tangent tan δb at 0 degrees C., wherein the loss tangents tan δc, tan δs and tan δb satisfy the following equation (1):

$$\tan \delta c < \tan \delta s \leq \tan \delta b \qquad (1).$$

As used herein, "loss tangent tan δ" is a value measured using a "viscoelastic spectrometer" manufactured by Iwamoto Seisakusho Co., Ltd. under the following conditions in accordance with the provisions of JIS-K6394.

Initial strain: 10%
Amplitude of dynamic strain: +−1%
Frequency: 10 Hz
Deformation mode: tension
Measurement temperature: 0 degrees C.

In the present disclosure, by adopting the above-mentioned configuration, it is possible to improve the grip performance during turning while maintaining the wear resistance performance during straight running. The reason for this is presumed to be the following mechanism.

In the present embodiment, since the loss tangent tan δs of the shoulder cap portions 13 is greater than the loss tangent tan δc of the crown cap portion 12, the crown cap portion 12, which comes into contact with the ground when straight running, can have relatively low heat generation and can maintain its wear resistance. On the other hand, the shoulder cap portions 13, which come into contact with the ground during turning, can generate moderate heat due to the deformation of the tread rubber 2G, and can exhibit excellent grip performance during turning.

Further, in the present disclosure, since the loss tangent tan δb of the base rubber layer 10 is equal to or more than the loss tangent tan δs of the shoulder cap portions 13, high heat generation can be expected with the base rubber layer 10. Thus, during straight running when the crown cap portion 12 comes into contact with the ground as well as during turning at relatively small camber angles, since an amount of deformation of the tread rubber 2G tends to be small, the heat generation of the base rubber layer 10 can be small, and the wear resistance performance during straight running can be maintained. Furthermore, during turning where the shoulder cap portions 13 come into contact with the ground, since the tread rubber 2G has a large amount of deformation, the base rubber layer 10 can generate heat moderately, and the grip force of the shoulder cap portions 13 can be further enhanced. It is presumed that the present disclosure can improve the grip performance during turning while maintaining the wear resistance performance during straight running due to such a mechanism.

Hereinafter, a more detailed configuration of the present embodiment will be described. Note that each configuration described below shows a specific aspect of the present embodiment. Thus, the present disclosure can exert the above-mentioned effects even if the tire does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

In the present embodiment, the loss tangent tan δc of the crown cap portion 12 (hereafter, it may be simply referred to as "tan δc"), the loss tangent tan δs of the shoulder cap portions 13 (hereafter, it may be simply referred to as "tan δs"), and the loss tangent tan δb of the base rubber layer 10 (hereafter, it may be simply referred to as "tan δb"), for example, are in a range from 0.20 to 1.60. Specifically, the tan δc, for example, is preferably in a range from 0.20 to 0.90, more preferably in a range from 0.70 to 0.90. The tan δs, for example, is preferably in a range from 0.80 to 1.40, more preferably in a range from 0.90 to 1.10. The tan δb, for example, is preferably in a range from 0.80 to 1.60, more preferably in a range from 1.00 to 1.20.

Further, the tan δs, for example, is in a range from 105% to 140% of the tan δc, preferably from 105% to 120%. Preferably, the tan δb is greater than the tan δs. The tan δb is more preferably in a range from 100% to 140% of the tan δs, still further preferably from 105% to 120%. As a result, damage such as separation of the rubber layers can be suppressed while exerting the above-mentioned effects.

Preferably, a JIS-A hardness of the shoulder cap portions 13 is in a range of −2 to +5 degrees with respect to a JIS-A hardness of the crown cap portion 12. Thus, transient characteristic of the response when tilting a vehicle body of a motorcycle can be improved, and uneven wear around the boundary between the crown cap portion 12 and the respective shoulder cap portions 13 can be suppressed while exerting the above-mentioned effects.

As used herein, "JIS-A hardness" means a hardness of rubber at 25 degrees C. measured by durometer type A based on JIS-K6253.

Similarly, a JIS-A hardness of the base rubber layer 10 is preferably in a range of −2 to +5 degrees with respect to a JIS-A hardness of the shoulder cap portions 13. This can prevent the separation between the base rubber layer 10 and the respective shoulder cap portions 13 during turning.

Note that the rubber layers having the above-mentioned characteristics can be obtained by appropriately combining known materials used in rubber production.

Preferably, a thickness of the base rubber layer 10 located inward in the tire radial direction of the shoulder cap portions 13 is larger than a thickness of the base rubber layer 10 located inward in the tire radial direction of the crown cap portion 12. Such a base rubber layer 10 can surely improve the grip performance during turning while maintaining the wear resistance performance during straight running.

In some more preferred embodiments, a thickness of the base rubber layer 10 may increase continuously from a middle region in the tire axial direction thereof toward both ends in the tire axial direction thereof. With this, the transient characteristic when tilting a vehicle body of a motorcycle can be improved.

A thickness t2 of the base rubber layer 10 at the center position of the ground contact surface of each shoulder cap portion 13 (the center position in the length direction of the ground contact surface of each cap portion 13 in a tire cross section) is preferably equal to or more than 1.5 times a thickness t1 of the base rubber layer 10 on the tire equator C, more preferably equal to or more than 1.8 times, but preferably equal to or less than 2.5 times the thickness t1, more preferably equal to or less than 2.2 times. This can help to improve the wear resistance during straight running and the grip performance during turning in a well-balanced manner.

In a region of inward in the tire radial direction of the crown cap portion 12, a thickness of the base rubber layer 10 is preferably equal to or more than 10%, more preferably in a range from 10% to 40% of a total thickness of the tread rubber 2G. Note that the total thickness of the tread rubber 2G is a thickness from the ground contact surface to an outer surface 2a of the belt layer 7. Further, in a region of inward in the tire radial direction of the crown cap portion 12, the minimum thickness of the base rubber layer 10 (in this embodiment, the thickness t1 on the tire equator C) is preferably in a range from 10% to 20% of the total thickness of the tread rubber 2G. This can help to maintain uneven wear resistance of the crown cap portion 12.

Preferably, the maximum width W2 in the tire axial direction of the ground contact surface of the crown cap portion 12 is in a range from 20% to 60% of the maximum width W1 (shown in FIG. 1) of the ground contact surface of the tread portion 2, more preferably from 20% to 40%. Thus, uneven wear resistance can be reliably maintained when straight running and when turning at relatively small camber angles.

In the present embodiment, the tread rubber 2G consists only of the base rubber layer 10 and the cap rubber layer 11 as mentioned above, and no other rubber components are disposed. Thus, the above effects can surely be exhibited. However, the present disclosure is not limited to such an aspect.

The ground contact surface 2a of the tread portion 2 may be provided with a plurality of grooves 15. In this case, it is preferable that a depth of the grooves 15 is smaller than the thickness of the cap rubber layer 11. In other words, it is preferable that the base rubber layer 10 is not exposed at a surface of the grooves 15. As a result, the base rubber layer 10 is not exposed even if the tread portion 2 wear progresses, and excellent wear resistance and steering stability can continuously be exhibited.

While the particularly preferable embodiments of the motorcycle tire in accordance with the present disclosure have been described in detail, the present disclosure is not limited to the illustrated embodiments, but can be modified and carried out in various aspects within the scope of the disclosure.

Working Example

Motorcycle tires (size: 180/55R17) for rear wheel tire with the basic structure shown in FIG. 1 were prepared based on the specifications in Tables 1 to 2. As a comparative example, a tire with a single crown rubber was also prepared. The tire of the comparative example has substantially the same configuration as the tire of the examples except for the above feature. The wear resistance performance during straight running, the grip performance during straight running, the grip performance during turning, and the steering stability of the test tires were tested. The common specifications and test methods for each test tire are as follows.

Rim size: MT5.50
Tire inner pressure: 250 kPa
Test vehicle displacement: 1000 cc Test for wear resistance when straight running:
The remaining rubber thickness at the center of the tread portion was measured after traveling 10,000 km on a general road with the above test tire. The test results are shown in Tables using an index with the remaining rubber thickness of the comparative example as 100. The larger the value, the larger the remaining rubber thickness and the better the wear resistance.

Test for grip performance when driving straight, grip performance when turning and turning stability:
The grip performance when driving straight, the grip performance when turning, and the turning stability when driving on a circuit with the above test tires were evaluated by the driver's sensuality. The test results are shown in Tables using a score with a comparative example of 100, and the larger the value, the better.

Tables 1 and 2 show the test results.

TABLE 1

|  | Ref | Ex. 1 | Ex. 2 | Ex. 3 | Ex. 4 | Ex. 5 | Ex. 6 | Ex. 7 |
|---|---|---|---|---|---|---|---|---|
| Loss tangent tan δc of crown cap portion | 0.80 | 0.80 | 0.72 | 0.76 | 0.84 | 0.88 | 0.80 | 0.80 |
| Loss tangent tan δs of shoulder cap portions | 0.80 | 1.00 | 1.00 | 1.00 | 1.00 | 1.00 | 0.90 | 0.95 |
| Loss tangent tan δb of base rubber layer | 0.80 | 1.10 | 1.10 | 1.10 | 1.10 | 1.10 | 1.10 | 1.10 |
| Wear resistance during straight running (index) | 100 | 100 | 104 | 102 | 100 | 98 | 100 | 100 |
| Grip performance during straight running (score) | 100 | 110 | 104 | 107 | 112 | 114 | 100 | 100 |
| Grip performance during turning (score) | 100 | 115 | 115 | 115 | 115 | 115 | 110 | 113 |
| Turning stability (scire) | 100 | 120 | 119 | 120 | 121 | 122 | 116 | 118 |

TABLE 2

|  | Ex. 8 | Ex. 9 | Ex. 10 | Ex. 11 | Ex. 12 | Ex. 13 |
|---|---|---|---|---|---|---|
| Loss tangent tan δc of crown cap portion | 0.80 | 0.80 | 0.80 | 0.80 | 0.80 | 0.80 |
| Loss tangent tan δs of shoulder cap portions | 1.05 | 1.10 | 1.00 | 1.00 | 1.00 | 1.00 |
| Loss tangent tan δb of base rubber layer | 1.10 | 1.10 | 1.03 | 1.07 | 1.15 | 1.20 |
| Wear resistance during straight running (index) | 100 | 100 | 102 | 100 | 100 | 99 |
| Grip performance during straight running (score) | 100 | 100 | 108 | 109 | 110 | 111 |
| Grip performance during turning (score) | 116 | 117 | 112 | 113 | 116 | 117 |
| Turning stability (scire) | 121 | 123 | 117 | 119 | 122 | 124 |

As a result of the test, it was confirmed that the tires of the example improved the grip performance during turning while maintaining the wear resistance performance during straight running. It was also confirmed that the tires of the example exhibited excellent turning stability.

The following additional notes are disclosed regarding the above-described embodiments.

[Additional Note 1]

A motorcycle tire comprising:

a tread portion with a ground contact surface, the tread portion comprising a tread rubber comprising a base rubber layer and a cap rubber layer disposed outward in a tire radial direction of the base rubber layer to form the ground contact surface of the tread portion, the cap rubber layer comprising a crown cap portion disposed in a middle region in a tire axial direction of the tread portion and a pair of shoulder cap portions disposed in both sides in the tire axial direction of the crown cap portion, and the crown cap portion having a loss tangent tan δc at 0 degrees C., the shoulder cap portions having a loss tangent tan δs at 0 degrees C., and the base rubber layer having a loss tangent tan δb at 0 degrees C., wherein the loss tangents tan δc, tan δs and tan δb satisfy the following equation (1):

$$\tan \delta c < \tan \delta s \leq \tan \delta b \qquad (1).$$

[Additional Note 2]

The motorcycle tire according to Additional note 1, wherein a thickness of the base rubber layer located inward in the tire radial direction of the shoulder cap portions is larger than a thickness of the base rubber layer located inward in the tire radial direction of the crown cap portion.

[Additional Note 3]

The motorcycle tire according to Additional note 1 or 2, wherein a thickness of the base rubber layer increases continuously from a middle region in the tire axial direction thereof toward both ends in the tire axial direction thereof

[Additional Note 4]

The motorcycle tire according to any one of Additional notes 1 to 3, wherein a JIS-A hardness of the shoulder cap portions is in a range of −2 to +5 degrees with respect to a JIS-A hardness of the crown cap portion.

[Additional Note 5]

The motorcycle tire according to any one of Additional notes 1 to 4, wherein a maximum width in the tire axial direction of the crown cap portion at the ground contact surface is in a range from 20% to 60% of a maximum width in the tire axial direction of the ground contact surface of the tread portion.

[Additional Note 6]

The motorcycle tire according to any one of Additional notes 1 to 5, wherein in a region of inward in the tire radial direction of the crown cap portion, a thickness of the base rubber layer is in a range from 10% to 40% of a total thickness of the tread rubber.

[Additional Note 7]

The motorcycle tire according to any one of Additional notes 1 to 6, wherein the ground contact surface of the tread portion is provided with a plurality of grooves, and the plurality of grooves has a depth smaller than a thickness of the cap rubber layer.

The invention claimed is:

1. A motorcycle tire comprising:
a tread portion with a ground contact surface,
a pair of sidewall portions,
a pair of bead portions each with a bead core therein,
a carcass extending between the pair of bead portions through the tread portion and the pair of sidewall portions, the carcass consisting of two carcass plies each comprising a plurality of carcass cords,
wherein
the tread portion comprises a tread rubber comprising a base rubber layer and a cap rubber layer disposed outward in a tire radial direction of the base rubber layer to form the ground contact surface of the tread portion,
the cap rubber layer comprises a crown cap portion disposed in a middle region in a tire axial direction of the tread portion and a pair of shoulder cap portions disposed in both sides in the tire axial direction of the crown cap portion,
the crown cap portion has a loss tangent tan δc in a range from 0.72 to 0.90 at 0 degrees C.,
the shoulder cap portions has a loss tangent tan δs in a range from 0.90 to 1.40 at 0 degrees C.,
the base rubber layer has a loss tangent tan δb at 0 degrees C., and
the loss tangents tan δc, tan δs and tan δb satisfy the following equation (1):

$$\tan \delta c < \tan \delta s \leq \tan \delta b \qquad (1).$$

2. The motorcycle tire according to claim 1, wherein a thickness of the base rubber layer located inward in the tire radial direction of the shoulder cap portions is larger than a thickness of the base rubber layer located inward in the tire radial direction of the crown cap portion.

3. The motorcycle tire according to claim 2, wherein a thickness of the base rubber layer increases continuously from a middle region in the tire axial direction thereof toward both ends in the tire axial direction thereof.

4. The motorcycle tire according to claim 2, wherein a JIS-A hardness of the shoulder cap portions is in a range of −2 to +5 degrees with respect to a JIS-A hardness of the crown cap portion.

5. The motorcycle tire according to claim 2, wherein a maximum width in the tire axial direction of the crown cap portion at the ground contact surface is in a range from 20% to 60% of a maximum width in the tire axial direction of the ground contact surface of the tread portion.

6. The motorcycle tire according to claim 2, wherein the tread portion comprises a pair of tread edges that are located outermost in the tire axial direction to form a tire maximum width, and the pair of shoulder cap portions extends to the pair of tread edges.

7. The motorcycle tire according to claim 1, wherein a thickness of the base rubber layer increases continuously from a middle region in the tire axial direction thereof toward both ends in the tire axial direction thereof.

8. The motorcycle tire according to claim 7, wherein a JIS-A hardness of the shoulder cap portions is in a range of −2 to +5 degrees with respect to a JIS-A hardness of the crown cap portion.

9. The motorcycle tire according to claim 7, wherein a maximum width in the tire axial direction of the crown cap portion at the ground contact surface is in a range from 20% to 60% of a maximum width in the tire axial direction of the ground contact surface of the tread portion.

10. The motorcycle tire according to claim 1, wherein a JIS-A hardness of the shoulder cap portions is in a range of −2 to +5 degrees with respect to a JIS-A hardness of the crown cap portion.

11. The motorcycle tire according to claim 1, wherein a maximum width in the tire axial direction of the crown cap portion at the ground contact surface is in a range from 20% to 60% of a maximum width in the tire axial direction of the ground contact surface of the tread portion.

12. The motorcycle tire according to claim 1, wherein in a region of inward in the tire radial direction of the crown cap portion, a thickness of the base rubber layer is in a range from 10% to 40% of a total thickness of the tread rubber.

13. The motorcycle tire according to claim 1, wherein
the ground contact surface of the tread portion is provided with a plurality of grooves, and
the plurality of grooves has a depth smaller than a thickness of the cap rubber layer.

14. The motorcycle tire according to claim 1, wherein the loss tangent tan $\delta b$ is greater than the loss tangents $\delta s$.

15. The motorcycle tire according to claim 1, wherein the tread portion comprises a pair of tread edges that are located outermost in the tire axial direction to form a tire maximum width, and the pair of shoulder cap portions extends to the pair of tread edges.

* * * * *